July 16, 1940.   M. A. WECKERLY   2,208,284
WEIGHING DEVICE
Filed April 6, 1937   3 Sheets-Sheet 3
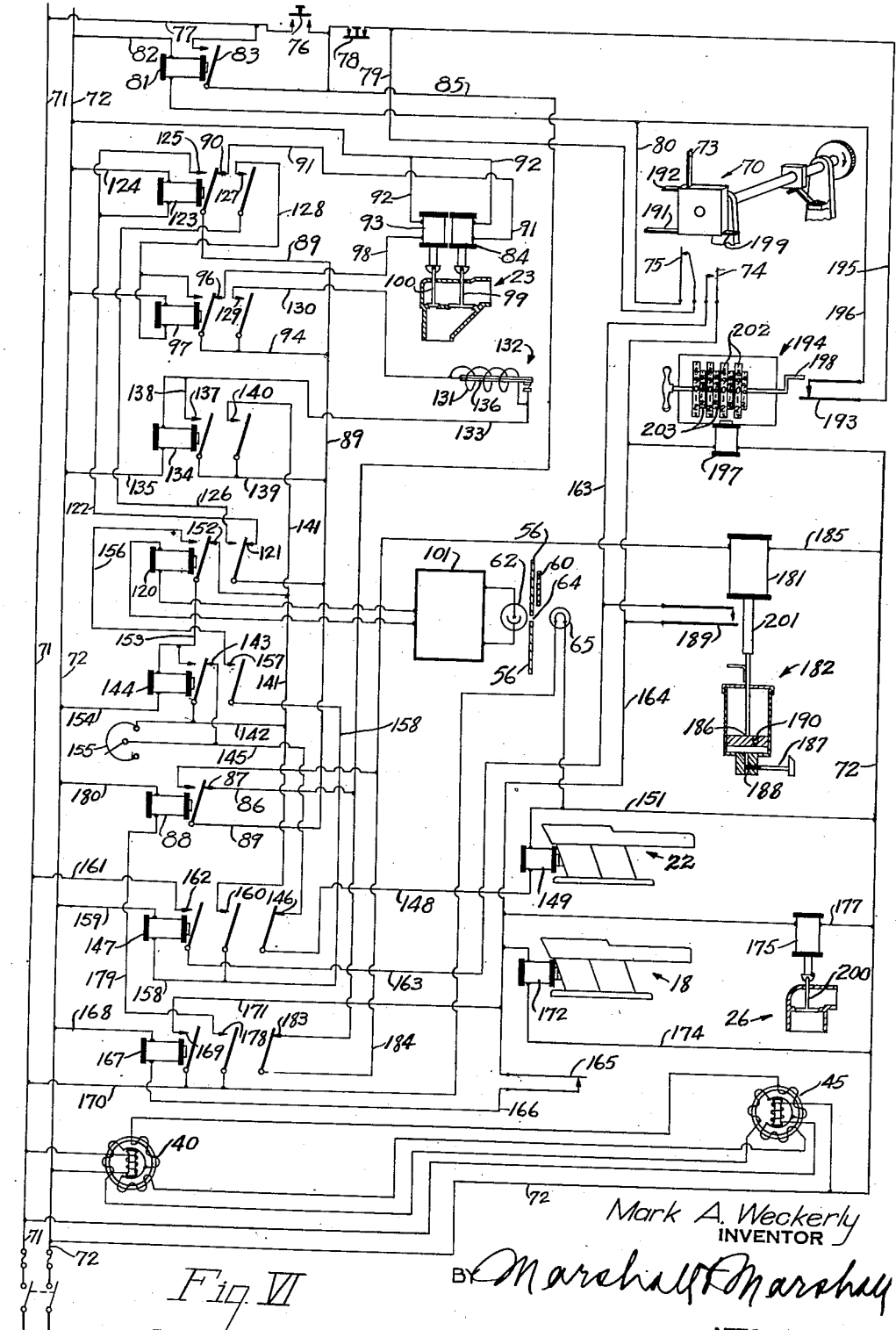
Fig. VI
Mark A. Weckerly
INVENTOR
BY Marshall & Marshall
ATTORNEYS Patented July 16, 1940

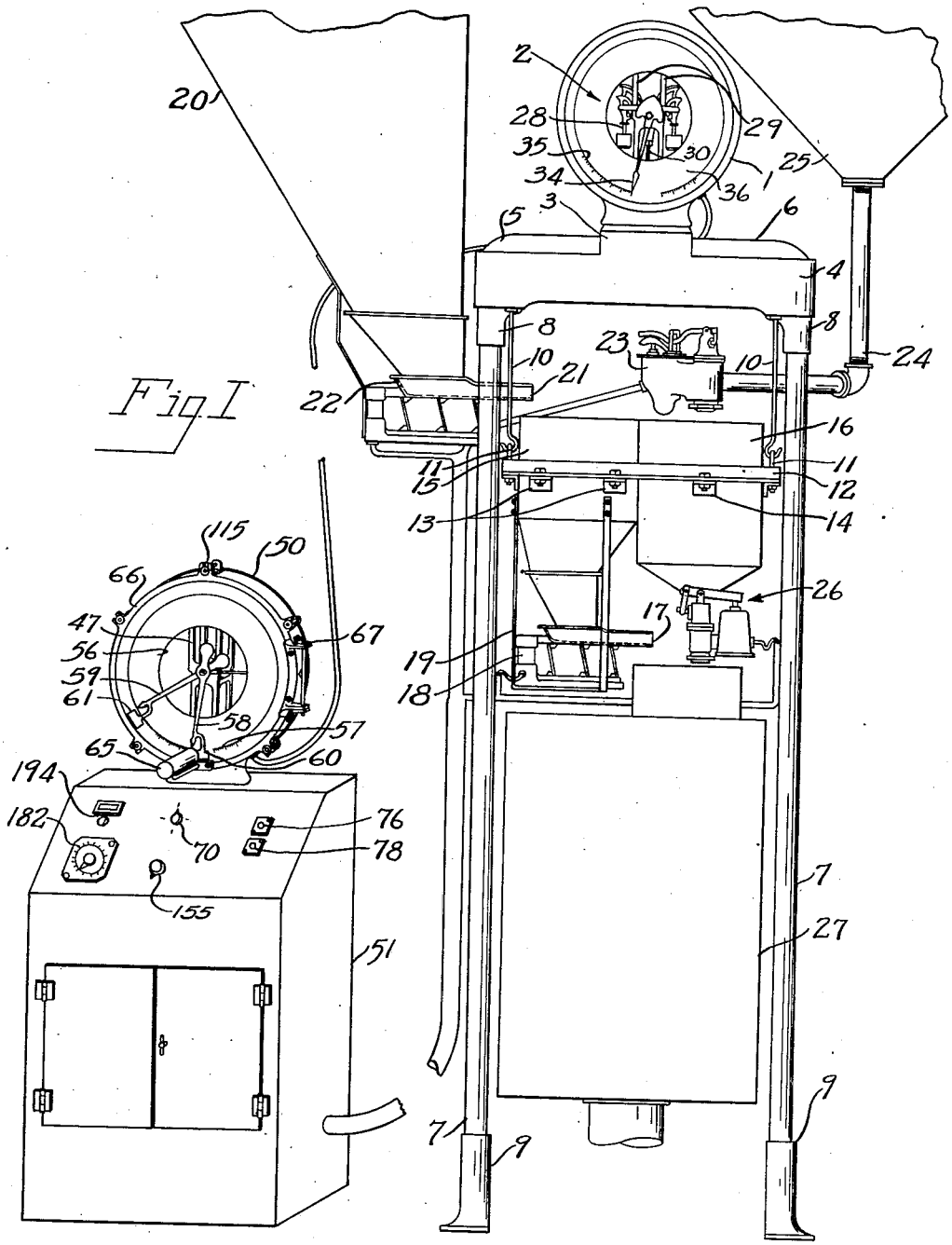

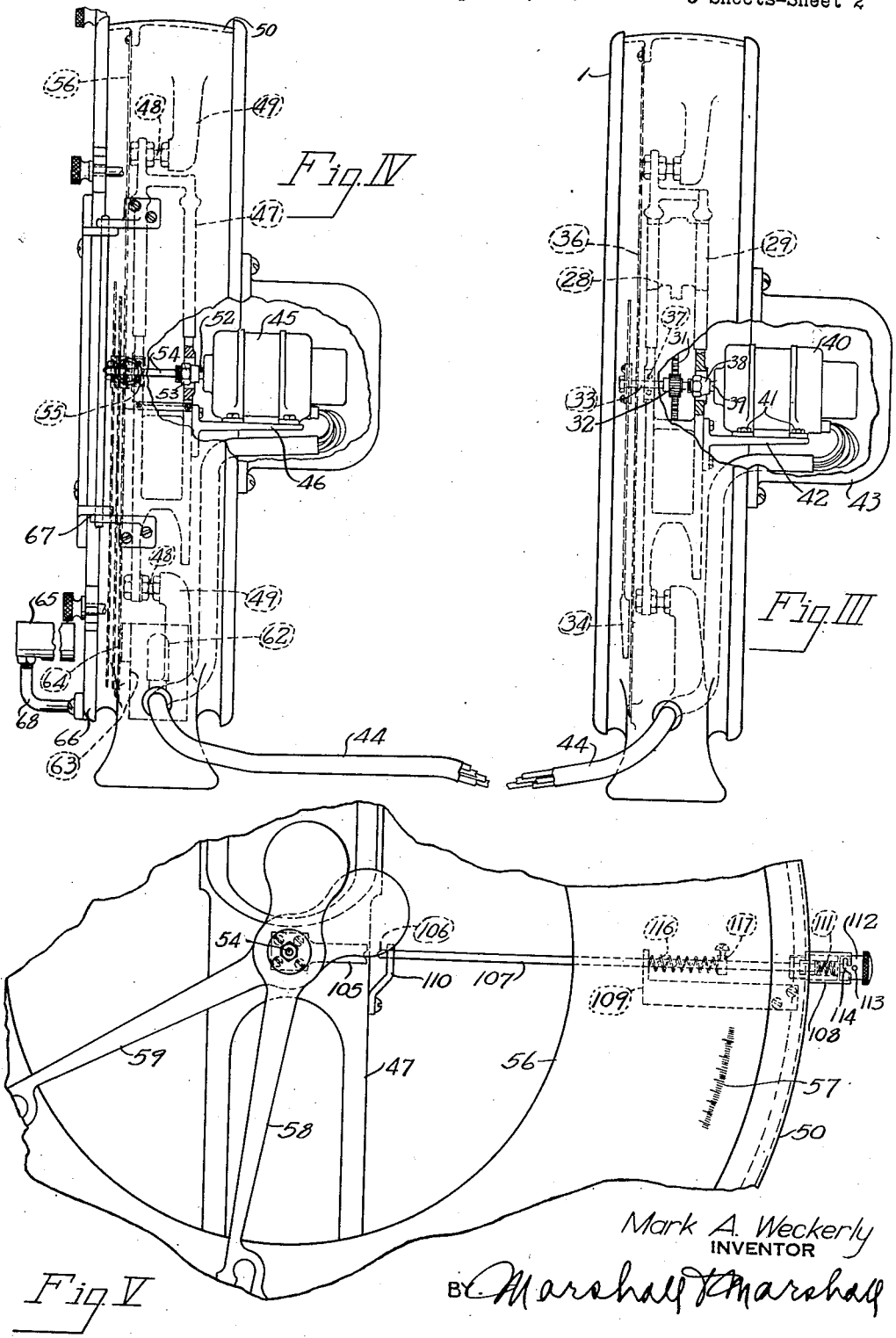

2,208,284

UNITED STATES PATENT OFFICE 2,208,284

WEIGHING DEVICE

Mark A. Weckerly, Toledo, Ohio, assignor to Toledo Scale Company, Toledo, Ohio, a corporation of New Jersey Application April 6, 1937, Serial No. 135,257

20 Claims. (Cl. 249—14)

This invention relates generally to weighing devices, and more particularly to weighing devices which are adapted to determine automatically predetermined amounts of more than one kind of fluent material and to deliver these materials to a receptacle. The materials may be granular, pulverulent or fluid.

The principal object of the invention is the provision of improved means for weighing predetermined quantities of a plurality of materials in preselected sequence.

Another object is the provision of improved means for varying the duration of each sequence.

Another object is the provision of improved means for controlling the weighing and feeding means from a remote point.

Still another object is the provision of means for conditioning the weighing and feeding mechanism to weigh in a preselected sequence a definite number of batches.

A further object is the provision of improved means whereby said feeding and weighing mechanism may be conditioned to discharge material, determined by said weighing mechanism, at predetermined intervals.

Still another object is the provision of improved electrical control means.

These and other objects and advantages will be apparent from the following description in which reference is had to the accompanying drawings illustrating a preferred embodiment of the invention, and wherein similar reference numerals refer to similar parts throughout the several views.

Referring to the drawings:

Figure I is a front elevational view of the weighing device and material feeding and cut-off means.

Figure II is a perspective view of the control cabinet.

Figure III is an enlarged side elevational view of the load counterbalancing and load indicating mechanism housing, a portion thereof being broken away.

Figure IV is a similar, enlarged side elevational view of the control mechanism housing, a portion thereof also being broken away to more clearly show details of construction.

Figure V is an enlarged fragmentary front elevational view of the control mechanism housing showing in detail the locking means for the interceptor shaft; and, Figure VI is a diagram of the electrical circuits.

Referring to the drawings in detail:

The weighing mechanism, illustrated in Figure I, comprises a substantially watchcase-shaped housing 1 in which is suitably disposed a load counterbalancing and indicating mechanism 2. Since, however, this mechanism per se is known and is fully explained and described in U. S. Patent No. 1,402,764 it is described herein only so far as is necessary to fully disclose the present invention.

The housing 1 is bolted to an integral shelf-like portion 3 of a base casing 4. This casing 4 contains, as usual, a leverage system (not shown) for supporting the load receiving means. Covers 5 and 6 serve to enclose the open wings of the base casing 4. To properly support the mechanism, hereinbefore referred to, in proper relation to co-operating mechanisms and means, pipes 7, threaded into brackets 8 secured to the base, and brackets 9 fastened to the floor, are provided. Supporting rods 10, secured to stirrups which are suspended from load pivots of the leverage system, within the base 4, are provided with hooks at their lower end which engage eyes 11 fixed in a load supporting frame 12. Brackets 13 and 14, bolted to the frame 12, support weighing hoppers 15 and 16 respectively. The hopper 15 at its lower end is provided with a funnel-like portion whose restricted opening extends into a trough 17 of a vibrator feeder 18. This vibrator feeder is supported upon a frame work 19 dependently secured to the upper portion of the hopper 15. An independently mounted supply hopper 20 is positioned so that a trough 21 of a vibrator conveyor 22 discharges into the hopper 15. The hopper 16, which also is secured to the frame 12, is mounted closely adjacent the hopper 15 and directly underneath an electrically controlled fluid discharge valve 23. This valve is connected by means of piping 24 to a fluid supply container 25. The lower end of the hopper 16 is provided with an electrically controlled discharge valve 26. This discharge valve 26, as well as the trough 17 of the vibrator feeder 18 are so positioned as to discharge the contents of the hoppers 15 and 16 into a common receptacle or, as in this case, into a mixing machine 27 which is stationed between the four supporting pipes 7.

The load counterbalancing mechanism comprises a pair of pendulums 28 fulcrumed by means of flexible metallic ribbons on a frame 29 stationed within the housing 1. A flexible linkage 30 serves to operatively connect the load counterbalancing mechanism 2 to the load supporting leverage system mounted in a base casing 4. A load placed in either of the hoppers 15 and 16 thus exerts a pull on the pendulum 28 through the leverage system and the linkage 30 and causes these pendulums to swing outwardly and upwardly until their weight moment balances the weight moment of the load in the usual manner. Since the movement of the pendulum is in direct proportion to the amount of load in the load container, a rack 31 (Figure III) operatively connected to the pendulums 28 and having its teeth mesh with the teeth of a pinion 32 causes a shaft 33 on which the pinion is mounted to be rotated through a proportional angle and an indicator 34, fixed to the shaft 33, indicates the proper weight indicium, in a row 35 of weight indicia, printed on a chart 36 which is suitably positioned in a housing 1. The shaft 33 near one of its ends is mounted in an antifriction bearing 37 stationed in the frame 29. Its other end is clamped by means of a chuck-like connection 38 to the rotor shaft 39 of a generator 40 of a self-synchronous generator-motor system. The generator 40 is secured by means of bolts 41 to a shelf 42 secured to the upright pendulum frame 29. A cover 43 serves to enclose the generator 40. Leads 44, in the usual manner, electrically connect the generator 40 to a motor 45 of the self-synchronous generator-motor system.

The motor 45 is mounted in a manner similar to the mounting of the generator 40. It is bolted to a shelf-like member 46 which is screwed to a vertically positioned frame 47. The frame 47 is fastened by means of bolts 48 to inwardly extending bosses 49 of a housing 50 surmounting a control cabinet 51 which may be positioned closely adjacent to or in a position remote from the weighing mechanism and it, and the housing 50, contain mechanism and means that are necessary for exercising complete control of the material feeding and weighing operations. The rotor shaft 52 of the motor 45 is provided with a chuck-like member 53 which is clamped to the rearward end of an indicator shaft 54. The forward end of this shaft 54 is mounted in an antifriction ball bearing 55 seated in a flange of the frame 47. Cooperating with a chart 56, bearing weight graduations 57 (Figures II and V), are a pair of indicators 58 and 59. These indicators are each provided with a flag-like interceptor 60 and 61 respectively, and are secured to hubs (not shown) which frictionally engage the shaft 54. They are adapted to be rotated and set in any desired position with reference to the weight graduations 51, for a purpose which will hereinafter be more fully described.

For the control of the material feeding means a photoelectric element 62, mounted in a case 63, is stationed in the interior of the housing 50 immediately in back of the zero indicium of the weight graduations 57 on the chart 56, and an aperture in the case 63 overlies a narrow slot 64, machined in the chart 56, through which light from a source 65 shines on the photoelectric element 62 when the slot is uncovered. The functions of each of these members are well known and are particularly described in U. S. Patent 2,067,743 to M. A. Weckerly.

So that the chart 56, with its series of graduations 57 and the indicators 58 and 59, can be readily viewed, a glazed frame 66 is hinged at 67 to the housing 50. The light source 65 is secured to an arm 68 which is studded into the frame 66 so that when the frame 66 is opened to gain access to the interior of the housing, the light source 65 will swing with it.

When it is desired to weigh batches of material comprising a predetermined amount by weight of a liquid and a predetermined amount by weight of a pulverulent or granular material the interceptors 60 and 61 are manually set to cover and uncover the slot 64 in the chart 56 to influence the action of the photoelectric element 62. Since the indicators 58 and 59 are held on the shaft 54 by means of friction hubs which are rigidly connected to the rotor of the self-synchronous generator motor system it is necessary that the shaft 54 be held fixedly in its zero position so that the rotors of the motor 45 and the generator 40 of the system will not be constrained to move out of their zero position as indicated by the indicator 34 and the chart 36 on the weighing device. For this purpose, the shaft 54 has fixedly attached thereto a latterly extending arm 105 whose free end is V notched and adapted, when the shaft is in the "zero" position to receive the chiseled edge end 106 of a locking rod 107 which is slidably positioned in a bushing 108 extending through the peripheral wall of the housing 50, through an aperture in an angle bracket 109 screwed to this wall and extending into the interior of the housing and through an aperture in a small formed bracket 110 fixed to the frame 47 which is positioned in the interior of the housing 50. That portion of the rod 107 which projects through the bushing 108 on the exterior of the housing has a small helical spring 111, coaxially fastened to it and the opposite end of this spring is secured to a push button 112 whose outside diameter is such that it is a sliding fit in the interior of the bushing 108. A laterally extending pin 113 is adapted to enter a bayonet slot 114 in the wall of the housing 108.

To position the indicators 58 and 59, the glazed frame 66 is unfastened by unscrewing the nuts on the hinged bolts 115, the bolts moved out of the furcations of the slotted ears and the glazed frame is opened on its hinge 67. All the load is removed from the weighing hoppers 15 and 16 of the weighing device until its indicator 34 points to the zero indicia on the chart 36. The rotors of the self-synchronous motor generator system thus are turned to their zero positions and the notch in the end of the arm 105 is in coincidence with the locking rod 107. Pressure on the push button 112 now exerts pressure on the spring 111 and this in turn on the locking rod 107 causing its chisel end 106 to enter the notch of the laterally extending arm 105. The pin 113 of the push button has now entered the horizontal portion of the bayonet slot 114 and a slight turn of the button 112 in a clockwise direction will lock the rod in its extended position. It will be noted that the only pressure on the locking rod is through the spring 111; thus injury to the shaft 54 is prevented if the rod is not properly centered.

If it is desired to weigh out, for example, batches of material which each contain 70 lbs. of a liquid constituent and 215 lbs. of a dry fluent constituent, after locking the shaft 54 in the manner hereinbefore described, the indicator 58 with its friction hub is rotated on the shaft in an anticlockwise direction until its index points to that indicium in the series of indicia 57 on the chart 56 which represents 70 lbs. Then the indicator 59 is similarly moved until its pointer points to the sum of the weight of the two materials, namely 70 lbs. and 215 lbs., or 285 lbs. The push button 112 is then released by turning the pin 113 out of the bayonet slot and a spring 116, circumjacently mounted on the rod 107 between the angular portion of the bracket 109 and a collar 117, forces the rod 107 out of engagement with the arm 105 freeing the self-synchronous motor generator system.

The embodiment of this invention, as indicated by the objects hereinbefore stated, is adapted to be conditioned to 1. Weigh and discharge predetermined amounts of material as rapidly as the device will operate.
2. Weigh and discharge predetermined amounts of material at predetermined intervals.
3. Weigh and discharge in rapid sequence a predetermined number of batches and,
4. Weigh and discharge at predetermined intervals a predetermined number of batches.

The means required to condition the weighing machine to accomplish these results are schematically shown in the wiring diagram (Figure VI). There are four electrical circuits and a four position selector switch 70 is provided to couple the proper circuit in series with the device to enable it to perform its function in the desired manner. Electrical lines 71 and 72 supply the alternating current necessary for the operation of the device.

To condition the device to weight batches of the material in the amounts stated in the foregoing example, after the interceptors 60 and 61 have been properly set, the selector switch 70 (Figure VI) is rotated through an angle of 180° from the position shown, so that the arm 73, which is a rigid part of the switch 70, engages the normally open contact 74 and closes the same. A contact 75 of this switch 70 is normally closed, thus in this set up the contacts 74 and 75 are closed. After the switch 70 has been set as described, pressure on the push button 76 initiates the actuation. A circuit is established through the leads 71 and 72, the push button 76, a normally closed emergency stop button 78, a lead 79, contact 75, lead 80, the coil of relay 81 and a lead 82 extending between the opposite end of the coil 81 and the power line 72. The resulting energization of the coil of the relay 81 causes its armature 83 to close and maintain the circuit in an energized condition when the pressure is removed from the push button 76. When the armature 83 of the coil of the relay 81 is drawn in, its normaly open contact is closed and coil 84 of the fast stream outlet of the liquid cutoff valve 23 is energized by the current through the aforementioned contacts, leads 85 and 86, through the normally closed contact 87 of relay 88 and thence through lead 89 through a normally closed contact 90 of a relay 123 and a lead 91. A lead 92 from the other side of the coil is connected to the power line 72 thus completing this circuit. Simultaneously a coil 93, which controls the dribble stream outlet of liquid cutoff valve 23 is energized through leads 89 and 94, the normally closed contact 96 of relay 97, lead 98, and lead 92 which extends from the other end of the coil 93 to the power line. Energization of the coils 84 and 93 causes the valve tappets 99 and 100 of the fast and dribble streams respectively to be drawn upwardly and the liquid in the supply tank 25 flows into the weighing hopper 16 through the piping 24 and through the open ports of the cutoff valve 23 at its highest rate.

The liquid will continue to flow into the hopper 16, which is suspended from the weighing mechanism, until the load offsetting pendulums 28, to which the hopper 16 is operatively connected through the lever system, influence the control means as the pendulums move outwardly and upwardly in counterbalancing the steadily increasing load.

The rack 31, operatively connected to the pendulums and partaking of their movement, rotates the shaft 33 through the pinion 32, and the indicator 34 also mounted on the shaft, indicates the increasing load on the chart 36.

Since the rotor of the generator is also fixedly connected to the shaft it moves through the same angle as the indicator 34 and through its electrical connection causes the rotor of the motor 45 to rotate through the same angle in the well known manner, however in an anticlockwise direction, and the index 58, which had been set to the 70 lb. indicium on the chart 56, approaches the zero position of this chart at the same rate of speed as the hand 34, which is rotating in a clockwise direction, approaches the indicium 35 on the chart 36. As the leading edge of the interceptor 60 covers the slot 64 in the chart 56 and shades the photoelectric element 62 the coil of relay 120, which was energized through the thermionic amplifier 101 when the photoelectric element 62 was energized, is immediately de-energized and a circuit is established through lead 89, normally closed contact 121 of relay 120, lead 122, coil of relay 123 and lead 124 which connects the opposite end of the coil to the power line 72, thus coil 123 is energized and its contact 125 maintains the circuit thus established. The normally closed contact 90 of relay 123 will now break the circuit through lead 91 de-energizing coil 84 of the valve 23. De-energizing this coil permits the tappet 99 to set itself on its port, shutting off the main stream of liquid flowing through the valve. Liquid, however, is still flowing through the small or dribble stream port. When the exact desired amount of liquid is deposited in the weigh hopper 16 the trailing edge of the interceptor 60 of the indicator 58 uncovers the slot 64 and light from the source 65 falls on the photoelectric element 62, again energizing relay 120 through the thermionic amplifier 101. A circuit is thus made through the line 89, normally open side of contact 121 of relay 120, lead 126, normally open contact 127 of relay 123, lead 128, through the coil 97 and through the lead extending between the coil 97 and the power line 72. This energizes the coil of relay 97 and its normally open contact maintains a circuit thus established.

The normally closed contact 96 now opens and de-energizes coil 93 through lead 98. This permits the tappet 100 to close the dribble stream port of valve 23 and all flow of liquid ceases. When the coil of relay 97 is energized its normally open contact 129 is closed and a circuit is made through the maintained circuit of lead 89, contact 129 of relay 97, line 130, heating coil 131 of a thermionic time delay switch 132, a lead 133, the coil of a relay 134 and thence through a lead 135 to the power line 72.

The ohmic resistance of heating coil 131 is several times that of the coil of relay 134 so that the circuit thus made does not allow sufficient current to flow to energize relay 134. Due to this resistance, the current flowing through the coil 131 generates heat which influences a bimetallic arm 136 of the time delay switch 132. In several seconds the heat thus generated is sufficient to close the normally open contact of the time delay switch 132. This immediately short circuits the heating coil 131 and current of full voltage is applied to coil 134 energizing the same. The normally open contact 137 maintains this time delay circuit through leads 138 and 139. A circuit also is established through the maintained power lead 89 and lead 139, normally open contact 140 of relay 134, leads 141 and 142, normally closed contact 143 of relay 144, through lead 145, normally closed contact 146 of relay 147, then through lead 148 to reciprocating motor 149 of the feeding vibrator conveyor 22 and a lead 151, extending from the other side of the reciprocating motor 149 to the power line 72. This circuit, when established, applies full voltage to the reciprocating motor 149 of the vibrator conveyor 22 and the solid fluent materials, flowing from the supply bin 20 by gravity, are fed at the highest, or fastest rate into the hopper 15.

The interceptor 61 of the indicator 59, which is controlled by the load counterbalancing pendulum, through the mechanism hereinbefore described is steadily approaching the slot 64 in the chart 56 as the material is being fed into the hopper 15. When the leading edge of the interceptor covers the slot 64 the coil of relay 120 is again de-energized as hereinbefore described. A circuit is now established through maintained lead 141, normally closed contact 152 of relay 120 and through the line 153, coil 144 and the power lead 154 of coil of relay 144. This energizes relay 144 and its normally open contact maintains the circuit. Closing of relay 144 opens the normally closed side of contact 143 and places a rheostat 155 in series with the circuit of the reciprocating motor 149. The rheostat 155, when inserted into the circuit as above described, cuts the voltage energizing the vibrator feeder thereby reducing its working amplitude and material is fed at a reduced or dribble rate. The instant when exactly the correct amount of material has been deposited in the hopper 15 the trailing edge of interceptor 61 uncovers the slot 64 and light again will illuminate the photoelectric element 62 and relay 120 is again energized. A circuit is now made through the maintained power lead 141, lead 142, the normally open side of contact 143 of relay 144, lead 153 and through the normally open side of contact 152 of relay 120, lead 156 and the normally open contact 157 of relay 144, and the lead 158, coil of relay 147, power lead 159 of this relay, and normally open contact 160 of relay 147 maintains this circuit.

The normally closed contact 146 of relay 147 now opens, breaking the circuit and de-energizing the reciprocating motor 149. This immediately stops the flow of the material over the conveyor 22 into the hopper 15. Immediately a circuit is made from the power line 71, through lead 161, the normally open contact 162 of relay 147, then through lead 163, through normally open contact 74 of switch 70, line 164, a switch 165 which is actuated by a lever of the weighing leverage system in the interior of the base casing 4, through lead 166, coil of relay 167 and then through lead 168 to the power line 72. A normally open contact 169 of the relay 167, which is closed when the relay is energized maintains the aforesaid described circuit in an energized condition around the switch 74 and contact 162. The closing of the normally open contact 169 of relay 167 simultaneously establishes a circuit to energize coil 172 of a reciprocating motor of the dry fluent material discharge conveyor 18 and coil 175 of the magnetically controlled liquid discharging valve 26. This circuit in addition comprises lead 170, the aforementioned contact 169, lead 171, lead 174, and lead 177. Energization of coil 172 immediately causes the vibratory conveyor 18 to discharge the material in the weighing hopper 15 into the mixing machine 27 and energization of solenoid coil 175 causes valve tappet 200 to be withdrawn from its port and thus permits the liquid in the weighing hopper 16 to flow into the mixing machine 27.

When coil 167 is energized a circuit is also made through power line 71, lead 170, normally open contact 178 of relay 167, line 179, coil of relay 88 and line 180 between coil of relay 88 and power line 72. The relay 88 is thus energized and its normally closed contact 87 will open the circuit which maintained the relays 123, 97, 134, 144 and 147 in an energized condition, thus de-energizing them. These relays 123, 97, 134, 144 and 147 are now in condition for subsequent operations.

When the scale hoppers are completely emptied, the weighing scale leverage system within the base casing 4 moves to its zero position and opens switch 165, thus de-energizing relays 167, 88, discharge valve 26 and discharge conveyor 18. Relay 81 still maintains its power circuit through lead 85 and when relay 88 is de-energized, as described above, a power circuit is again established through lead 89 and the cycle will repeat. The device will weigh solid and liquid materials at fast and dribble speeds as rapidly as possible and discharge both materials at the end of the cycle and again repeat the operation until the main circuit is broken by pressure on button 78.

When it is desired to weigh batches of predetermined amounts of material so that the material is discharged at predetermined intervals the selector switch 70 is turned so that the arms are in the position shown in Figure VI, that is, contact 75 is closed and contact 74 is open. Pressure on push button 76 establishes a circuit, as previously described, and at the same time energizes solenoid coil 181 through lead 85, through normally closed contacts 183 of relay 167, through line 184 and lead 185 to power line 72. The armature 201 of the solenoid coil 181 is connected to a plunger 186 of a well known air dashpot type time delay relay 182. Therefore, as soon as the button 76 is depressed, coil 181 will slowly start to draw its plunger 186 upwardly; its movement being restricted by the vacuum created by the stricture of screw 187 in aperture 188 in the body of the time delay relay. When the plunger 186 has reached the limit of its travel it engages switch 189 and closes the same. Since switch 74 is open, when the final cutoff of the second or solid fluent material being weighed out occurs and relay 147 is energized as described above, the circuit to coil 167 will not be made through lead 161, contact 162 of relay 147 and through lines 163 and 164 until contact 189, forming a part of the plunger 186 of the time delay relay 182, is made after expiration of a predetermined time delay. The time may be determined by varying the stricture caused by screw 187 in the aperture 188 in the lower end of the time delay relay 182; contacts 189 will close and the circuit to coil 167, as described above, will be completed through lead 164, switch 165 and lead 166. The closing of relay 167 initiates the discharge of the material as described. When the relay 167 is energized its normally closed contact 183 opens and de-energizes the coil 181 of time delay relay through the lead 184. Plunger 186 immediately falls to its lowermost position since it is equipped with a check valve 190 which is closed when the plunger is being drawn upwardly but open when the plunger is falling. When contact 178 of relay 167 energizes relay 88, as hereinbefore described, the normally open side of contacts 87 of relay 88 will again be energized through leads 184, coil 181 of time delay relay 182 and reinitiate the time cycle. Since the discharging cycle has been started, and no change has been made in the circuit controlling it, the cycle will repeat at a frequency determined by the time delay relay.

When it is desired to weigh and discharge as rapidly as possible a predetermined number of batches of material the selector switch 70 is rotated in a clockwise direction until arm 191 closes contact 74, and arm 182 opens contact 75.

Reference to Figure VI will show that leads 79 and 80 of contact 75 of the selector switch 70 parallel leads 195 and 196 to the contact 193 of a magnetically operated predetermined counter 194 so that when the selector switch has been set, as described above, contact 193 controls the circuit to the coil of relay 81. Magnet 197 of the magnetically operated counter 194 is energized each time that the discharge conveyor 18 and discharge valve 26 are energized. The counter 194, employed in the embodiment of this invention, is a well known device and therefore requires no detailed description. It is equipped with two sets of indicia bearing counting wheels 202 and 203. One set is adapted to be set to a desired number and the other set is magnetically actuated whenever the discharge of material takes place, for example, if 4500 batches of material are desired the wheels 202 are set so that their indicia determines the numeral 4500. The wheels 203, starting from a zero position, are advanced step by step until their indicia total the numeral 4500. When this takes place mechanism (not shown) will actuate an arm 198 which will open the contact 193. It has been previously stated that contacts of relay 81 close the power circuit from line 71, through lead 77, through the contacts of relay 81, through lead 85 and determines the feeding sequences; therefore, when a predetermined number of batches have been discharged, contact 193, as described above, will open, de-energizing the coil of relay 81 so that the subsequent filling operation, after the predetermined number have been completed, will be obviated by the de-energization of coil of relay 81.

It will be seen that to operate the device so that it weighs and discharges a predetermined number of batches at predetermined intervals the control arrangement will be a combination of two systems hereinbefore described. In this latter arrangement, selector switch 70 is rotated so that arm 199 engages and opens contact 75. When contact 75 is open the predetermined counter 194 is in the control circuit and with switch 74 open, timing switch 182 is in the control circuit as hereinbefore described.

It will be seen that the invention is well adapted to fulfill all the objects primarily stated. It is to be understood however that the invention is susceptible to modification, variation and change within the spirit and scope of the subjoined claims.

Having described my invention, I claim:

1. In a device of the class described, in combination, weighing mechanism, material feeding means for feeding material to said weighing mechanism to determine a predetermined quantity of such material, a photoelectric means, remotely positioned from said weighing mechanism and cooperating therewith for exercising control over said material feeding means, electromagnetic means extending between said photoelectric means and said weighing mechanism, said electro magnetic means comprising a self-synchronous generator motor system, an indicator for actuating said photo-electric means that is movable by said generator motor system in accordance with the movement of said weighing mechanism, an adjustable connection between said indicator and said generator motor system to provide for the positioning of said indicator while said generator motor system remains stationary.

2. In a device of the class described, in combination, weighing mechanism, a plurality of material supply containers, means for discharging predetermined amounts of material in preselected sequence from said containers onto said weighing mechanism and controlling means whereby such material is discharged at preselected intervals and the discharge is interrupted when a preselected number of discharges of such material have occurred, said controlling means comprising an electric circuit, a dashpot controlled time delay relay and electrically operated predetermined counting means.

3. In a device of the class described, in combination, weighing mechanism, a material supply container, means for sequentially discharging predetermined amounts of material from said supply container onto said weighing mechanism, controlling apparatus comprising means whereby an unlimited number of batches of predetermined weight of such material are discharged at rapid rate, means whereby an unlimited number of batches are discharged at predetermined intervals; means whereby a preselected number of batches are discharged at a rapid rate; means whereby a preselected number of batches are discharged at preselected intervals, said controlling apparatus including electrical circuits and a selector switch for selectively coupling said discharging means with certain of said discharge controlling means to condition said discharging means to discharge the desired number of batches at the desired rate.

4. In a batching device of the class described, in combination, weighing mechanism comprising a load receiving hopper, load counterbalancing and load indicating mechanisms operatively connected to said load receiving hopper, a material supply container, a reciprocating feeding means for delivering material to said load receiving means, a control indicator located remotely from said weighing mechanism, electrically operated means for moving said indicator in accordance with the movement of said weighing mechanism, an adjustable connection between said indicator and said electrically operated means to provide for the positioning of said indicator while said electrically operated means remains stationary, and means actuated by said indicator to interrupt the operation of said feeding means when the required amount of material, predetermined by the positioning of said indicator, has been deposited on said load receiving means, a reciprocating motor operated feeding means having a vibrating trough for discharging such material in said load receiver, said vibrating trough forming the bottom of said load receiving hopper.

5. In a batching device of the class described, in combination, weighing mechanism comprising a load receiving hopper, load counterbalancing and load indicating mechanisms operatively connected to said load receiving hopper, a material supply container, a reciprocating feeding means for delivering material to said load receiving means, a control indicator located remotely from said weighing mechanism, electrically operated means for moving said indicator in accordance with the movement of said weighing mechanism, an adjustable connection between said indicator and said electrically operated means to provide for the positioning of said indicator while said electrically operated means remains stationary, and means actuated by said indicator to interrupt the operation of said feeding means when the required amount of material, predetermined by the positioning of said load indicator, has been deposited in said load receiving hopper and a reciprocating motor operated feeding means having a vibrating trough for discharging such material in said load hopper, said vibrating trough forming the bottom of said load receiving hopper, said remotely positioned control means comprising a photoelectric element and an amplifying circuit.

6. In a batching device of the class described, in combination, weighing mechanism comprising a load receiving hopper, load counterbalancing and load indicating mechanisms operatively connected to said load receiving hopper, a material supply container, a feeding means having a reciprocating motor for delivering material to said load receiving hopper, a control indicator located remotely from said weighing mechanism, electrically operated means for moving said indicator in accordance with the movement of said weighing mechanism, an adjustable connection between said indicator and said electrically operated means to provide for the positioning of said indicator while said electrically operated means remains stationary, and means actuated by said indicator to interrupt the operation of said feeding means when the required amount of material, predetermined by the positioning of said indicator, has been deposited in said load receiving means and a reciprocating motor operated feeding means having a vibrating trough for discharging material accumulated in said load receiving hopper, said vibrating trough of said feeding means forming the bottom thereof, and its reciprocating motor being attached thereto.

7. In a batching device of the class described, in combination, a weighing device comprising pendulum load counterbalancing mechanism, load indicating means actuated thereby, load receiving means operatively connected thereto, material feeding and material discharging means cooperating with said pendulum load counterbalancing mechanism and said load receivers, and a remotely positioned photoelectric control mechanism for controlling the operation of said material feeding and material discharging means, said control mechanism comprising a photoelectric means, a light source and an interceptor adapted to pass between said photoelectric means and said light source and electric means for moving said interceptor in unison with said load indicating means, an adjustable connection between said interceptor and said electric means to provide for the positioning of said interceptor while said electric means remains stationary.

8. In a batching device of the class described, in combination, a weighing device comprising pendulum load counterbalancing mechanism, load indicating means actuated thereby, load receiving means operatively connected thereto, material feeding and material discharging means cooperating with said pendulum load counterbalancing mechanism and said load receivers, and a remotely positioned photoelectric control mechanism for controlling the operation of said material feeding and material discharging means, said control mechanism comprising a photoelectric means, a light source and an interceptor adapted to pass between said photoelectric means and said light source and electric means for moving said interceptor in unison with said load indicating means, said electric means for moving said interceptor comprising a self-synchronous generator motor system, an adjustable connection between said interceptor and said generator motor system to provide for the positioning of said interceptor while said generator motor system remains stationary.

9. In a batching device of the class described, in combination, a weighing device comprising pendulum load counterbalancing mechanism, load indicating means actuated thereby, load receiving means operatively connected thereto, material feeding and material discharging means cooperating with said pendulum load counterbalancing mechanism and said load receivers, and a remotely positioned photoelectric control mechanism for controlling the operation of said material feeding and material discharging means, said control mechanism comprising a photoelectric means, a light source and an interceptor adapted to pass between said photoelectric means and said light source and electric means for moving said interceptor in unison with said load indicating means, said electric means for moving said interceptor comprising a self-synchronous generator motor system, said generator of said self-synchronous generator motor system being attached to and actuated by said load counterbalancing mechanism and said motor being attached to and actuating said interceptor, an adjustable connection between said interceptor and said generator motor system to provide for the positioning of said interceptor while said generator motor system remains stationary.

10. In a batching device, in combination, weighing mechanism, conveying means for feeding material to said weighing mechanism, conveying means for discharging material from said weighing mechanism, remote means for controlling said conveying means, said controlling means comprising a housing, an indicia bearing chart within said housing, said chart having an aperture, a photoelectric element stationed on one side of said chart, a light source positioned so as to illuminate said photoelectric element through said aperture, a shaft rotatably mounted in said housing, electric means actuated by said weighing mechanism for rotating said shaft, an indicator frictionally mounted on said shaft cooperating with said indicia on said chart and having a portion extending between said light source and said photoelectric element on a plane passing through said aperture in said chart and manipulative means for locking said shaft in zero position, whereby said indicator may be positioned while said shaft is locked, for predetermining the operation of said controlling means.

11. In a batching device, in combination, weighing mechanism, conveying means for feeding material to said weighing mechanism, conveying means for discharging material from said weighing mechanism, remote means for controlling said conveying means, said controlling means comprising a housing, an indicia bearing chart within said housing, said chart having an aperture, a photoelectric element stationed on one side of said chart, a light source positioned so as to illuminate said photoelectric element through said aperture, a shaft rotatably mounted in said housing, electric means actuated by said weighing mechanism for rotating said shaft, an indicator frictionally mounted on said shaft cooperating with said indicia on said chart and having a portion extending between said light source and said photoelectric element on a plane passing through said aperture in said chart and manipulation means for locking said shaft in zero position, said manipulative locking means comprising an arm secured to said rotatable shaft and a plunger adapted to engage said arm and extending to the exterior of housing.

12. In a batching device, in combination, weighing mechanism, conveying means for feeding material to said weighing mechanism, conveying means for discharging material from said weighing mechanism, remote means for controlling said conveying means, said controlling means comprising a housing, an indicia bearing chart within said housing, said chart having an aperture, a photoelectric element stationed on one side of said chart, a light source positioned so as to illuminate said photoelectric element through said aperture, a shaft rotatably mounted in said housing, electric means actuated by said weighing mechanism for rotating said shaft, an indicator frictionally mounted on said shaft cooperating with said indicia on said chart and having a portion extending between said light source and said photoelectric element on a plane passing through said aperture in said chart and manipulation means for locking said shaft in zero position, said manipulative locking means comprising an arm secured to said rotatable shaft, a plunger adapted to engage said arm and extending to the exterior of housing and said extending portion of said plunger having a handle and a resilient member between said plunger and said handle.

13. In a batching device, in combination, weighing mechanism, conveying means for feeding material to said weighing mechanism, conveying means for discharging material from said weighing mechanism, remote means for controlling said conveying means, said controlling means comprising a housing, an indicia bearing chart within said housing, said chart having an aperture, a photoelectric element stationed on one side of said chart, a light source positioned so as to illuminate said photoelectric element through said aperture, a shaft rotatably mounted in said housing, electric means actuated by said weighing mechanism for rotating said shaft, a plurality of indicators, mounted on and frictionally engaging said shaft, cooperating with said indicia and having interceptors adapted to intercept light from said light source and shade said photoelectric element.

14. In an automatic weighing machine, in combination, material feeding means, weighing means, means controlled by said weighing means and controlling said material feeding means, a control indicator located remotely from said weighing means for actuating the means that controls the material feeding means, electrically operated means for moving said indicator in accordance with the movement of said weighing mechanism, an adjustable connection between said indicator and said electrically operated means to provide for the positioning of said indicator while said electrically operated means remains stationary, and means actuated by said indicator to control the feeding of material from said material feeding means to said weighing means.

15. In a device of the class described, in combination, batching mechanism comprising weighing mechanism including a load receiver with load counterbalancing mechanism operatively connected thereto, cooperating material supply means, means for discharging material from said supply means into said load receiver, a circuit controller, a control indicator located remotely from said weighing mechanism for actuating said circuit controller, electrically operated means for moving said indicator in accordance with the movement of said weighing mechanism, an adjustable connection between said indicator and said electrically operated means to provide for the positioning of said indicator while said electrically operated means remains stationary, and means actuated by said circuit controller to shut off said discharging means when a selected amount of material, predetermined by the positioning of said indicator, is received by said load receiver.

16. In a device of the class described, in combination, batching mechanism comprising weighing mechanism including a load receiver with load counterbalancing means operatively connected thereto, a plurality of material supply means, means for discharging materials from each of said supply means into said load receiver, a circuit controller, a control indicator located remotely from said weighing mechanism for actuating said circuit controller, electrically operated means for moving said indicator in accordance with the movement of said weighing mechanism, an adjustable connection between said indicator and said electrically operated means to provide for the positioning of said indicator while said electrically operated means remains stationary, and means actuated by said circuit controller to shut off said discharging means when a selected amount of material, predetermined by the positioning of said indicator, is received by said load receiver.

17. In a device of the class described, in combination, batching mechanism comprising weighing mechanism including a load receiver with load counterbalancing means operatively connected thereto, a plurality of material supply means, means for successively discharging predetermined amounts of such material from each of said plurality of material supply means into said load receiver, a circuit controller, a control indicator located remotely from said weighing mechanism for actuating said circuit controller, electrically operated means for moving said indicator in accordance with the movement of said weighing mechanism, an adjustable connection between said indicator and said electrically operated means to provide for the positioning of said indicator while said electrically operated means remains stationary, and means actuated by said circuit controller to shut off said discharging means when a selected amount of material, predetermined by the positioning of said indicator, is received by said load receiver.

18. In a device of the class described, in combination, weighing mechanism, material feeding means for feeding material to said weighing mechanism to determine a predetermined quantity of such material, a photo-electric circuit controller, a control indicator located remotely from said weighing mechanism for actuating said circuit controller, electrically operated means for moving said indicator in accordance with the movement of said weighing mechanism, an adjustable connection between said indicator and said electrically operated means to provide for the positioning of said indicator while said electrically operated means remains stationary, and means actuated by said circuit controller to shut off said material feeding means when a selected amount of material, predetermined by the positioning of said indicator, is received by said weighing mechanism.

19. In a device of the class described, in combination, weighing mechanism, a plurality of material supply hoppers, means for discharging material from each of said hoppers in a preselected sequence onto said weighing mechanism, a circuit controller, a control indicator located remotely from said weighing mechanism for actuating said circuit controller, electrically operated means for moving said indicator in accordance with the movement of said weighing mechanism, an adjustable connection between said indicator and said electrically operated means to provide for the positioning of said indicator while said electrically operated means remains stationary, means actuated by said circuit controller to shut off said discharging means when a selected amount of material, predetermined by the positioning of said indicator, is received by said weighing mechanism, and means for incorporating said sequential material discharged when a preselected number of discharges of material have occurred.

20. In a device of the class described, in combination, weighing mechanism, a plurality of material supply hoppers, means for discharging material from each of said hoppers in a preselected sequence onto said weighing scales, remotely positioned means for exercising control of said discharging means, said remotely positioned means including a circuit controller, a control indicator for actuating said circuit controller, electrically operated means for moving said indicator in accordance with the movement of said weighing mechanism, an adjustable connection between said indicator and said electrically operated means to provide for the positioning of said indicator while said electrically operated means remains stationary, means actuated by said circuit controller to shut off said discharging means when a selected amount of material, predetermined by the positioning of said indicator, is received by said weighing mechanism, means for interrupting said sequential material discharged when a preselected number of discharges of material have occurred, and means for interrupting said feeding sequence, said means comprising an electrically operated predetermined counter.

MARK A. WECKERLY.